US012254848B2

(12) United States Patent
Ishii

(10) Patent No.: US 12,254,848 B2
(45) Date of Patent: Mar. 18, 2025

(54) DISPLAY DEVICE AND SOURCE DRIVER

(71) Applicant: LAPIS Technology Co., Ltd., Yokohama (JP)

(72) Inventor: Hiroaki Ishii, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/638,611

(22) Filed: Apr. 17, 2024

(65) Prior Publication Data

US 2024/0355304 A1 Oct. 24, 2024

(30) Foreign Application Priority Data

Apr. 20, 2023 (JP) ................................ 2023-069342

(51) Int. Cl.
*G09G 3/36* (2006.01)

(52) U.S. Cl.
CPC ....... *G09G 3/3685* (2013.01); *G09G 2370/10* (2013.01); *G09G 2370/14* (2013.01)

(58) Field of Classification Search
CPC .................................................... G09G 3/3685
See application file for complete search history.

(56) References Cited

U.S. PATENT DOCUMENTS

2023/0317025 A1* 10/2023 Morita ................ G09G 3/2096 345/212

FOREIGN PATENT DOCUMENTS

JP 2021135394 9/2021

* cited by examiner

*Primary Examiner* — Gustavo Polo
(74) *Attorney, Agent, or Firm* — JCIPRNET

(57) ABSTRACT

A display device includes a display panel, a gate driver; a source driver, supplying gradation voltage signals to multiple pixel parts via multiple data lines based on a video data signal, and supplying to the gate driver a gate control signal; and a video data transmission part, transmitting the video data signal to the source driver by using LVDS. The video data transmission part assigns, to an empty region that is a region other than regions assigned to multiple pixel data pieces forming one pixel of the video data signal in each data packet defined for a time of transmitting the video data signal for one pixel by using LVDS, an arithmetic value calculated based on the pixel data pieces, and transmits to the source driver together with the pixel data pieces as the video data signal.

9 Claims, 11 Drawing Sheets

```
S[3:0]={O_R3, O_R2, O_R1, O_R0}
         +{O_R7, O_R6, O_R5, O_R4}
         +{O_G3, O_G2, O_G1, O_G0}
         +{O_G7, O_G6, O_G5, O_G4}
         +{O_B3, O_B2, O_B1, O_B0}
         +{O_B7, O_B6, O_B5, O_B4}
         +{E_R3, E_R2, E_R1, E_R0}
         +{E_R7, E_R6, E_R5, E_R4}
         +{E_G3, E_G2, E_G1, E_G0}
         +{E_G7, E_G6, E_G5, E_G4}
         +{E_B3, E_B2, E_B1, E_B0}
         +{E_B7, E_B6, E_B5, E_B4}
         +{O_VS, O_HS, O_DE, (O_DE)}
```

FIG. 5

S[3:0]={O_R7, O_R6, O_R5, O_R4}
+{O_G7, O_G6, O_G5, O_G4}
+{O_B7, O_B6, O_B5, O_B4}
+{E_R7, E_R6, E_R5, E_R4}
+{E_G7, E_G6, E_G5, E_G4}
+{E_B7, E_B6, E_B5, E_B4}
+{O_VS, O_HS, O_DE, (O_DE)}

FIG. 9

DISPLAY DEVICE AND SOURCE DRIVER

CROSS-REFERENCE TO RELATED APPLICATION

This application claims priority under 35 USC 119 from Japanese Patent application No. 2023-069342 filed on Apr. 20, 2023, the disclosure of which is incorporated by reference herein.

BACKGROUND

Technical Field

The disclosure relates to a display device and a source driver.

Description of Related Art

As a means for driving a display device, such as a liquid crystal display device or an organic electro-luminescence (EL) display device, etc., active matrix driving is adopted. In a display device adopting active matrix driving, a display panel is formed by a semiconductor substrate on which pixel parts and pixel switches are arranged in a matrix. Display is performed by controlling ON/OFF of the pixel switches through gate pulses and, when the pixel switches are turned on, supplying to the pixel parts gradation voltage signals corresponding to a video data signal to control the brightness of each pixel part.

In such display device, a source driver that detects the occurrence of an abnormality in the communication between a timing controller and the source driver and visually notifies that the abnormality has occurred has been proposed (see, for example, Japanese Laid-open No. 2021-135394). In a display device for vehicles, video data are transmitted to a source driver from a transmission-side LSI by using a transmission technique of low voltage differential signaling (LVDS). In the data format of LVDS, in the data region corresponding to a data packet for one pixel, only image data of 8 bits for each of RGB and a synchronization signal of DE/HS/VS are defined. Therefore, in the case of detecting an abnormality according to the above conventional technique in a display device that comes with video data transmission by using LVDS, the expected value of a CRC code generally used in abnormality detection needs to be transmitted by using another interface, such as I2C.

Therefore, the source driver receiving the video data transmitted by using LVDS cannot perform abnormality detection until the reception of the video data of a specified area in the frame ends, so it is difficult to respond to sudden noises, etc. In addition, since the transmission of video data by using LVDS and the transmission of CRC codes by using the interface such as I2C are not synchronized, the video data whose display contents change in every frame cannot be handled, and only video data corresponding to a fixed display area can serve as a determination target.

The disclosure provides a display device able to, during transmission of video data by using LVDS, quickly detect and visually present the occurrence of a communication abnormality.

SUMMARY

A display device according to an aspect of the disclosure includes: a display panel, having data lines, gate lines, and pixel parts provided in a matrix arrangement at respective intersection parts between the data lines and the gate lines; a gate driver, supplying gate signals to the gate lines; a source driver, receiving a video data signal indicating a video displayed on the display panel, supplying gradation voltage signals to pixel parts via the data lines based on the video data signal, and supplying to the gate driver a gate control signal controlling an operation of the gate driver; and a video data transmission part, . . . , transmitting the video data signal to the source driver by using low voltage differential signaling (LVDS). The video data transmission part assigns, to an empty region that is a region other than regions assigned to pixel data pieces forming one pixel of the video data signal in each data packet defined for a time of transmitting the video data signal for one pixel by using LVDS, an arithmetic value calculated based on the pixel data pieces, and transmits to the source driver together with the pixel data pieces as the video data signal.

In addition, a source driver according to another aspect of the disclosure is connected with a display panel having data lines, gate lines, and pixel parts provided in a matrix arrangement at respective intersection parts between the data lines and the gate lines, receives a video data signal transmitted by using low voltage differential signaling (LVDS), generates gradation voltage signals based on the video data signal that is received, and supplies the gradation voltage signals to the pixel parts. The source driver includes: a receiving part, receiving the video data signal; an acquisition part, acquiring a code value of a checksum included in each data packet for one pixel in the video data signal that is received; and a calculation part, calculating a code value of a checksum based on pixel data pieces included in each data packet for one pixel in the video data signal that is received; and a comparison part, comparing the code value of the checksum acquired by the acquisition part and the code value of the checksum calculated by the calculation part. The source driver determines whether a communication error occurs in transmission of the video data signal based on a comparison result.

BRIEF DESCRIPTION OF THE DRAWINGS

FIG. 5 is a diagram illustrating an example of checksum calculation.

FIG. 9 is a diagram illustrating another example of checksum calculation.

DESCRIPTION OF THE EMBODIMENTS

According to the display device according to the disclosure, in the image communication by using LVDS, the occurrence of a communication abnormality can be quickly detected, and the occurrence of the abnormality can be visually presented.

In the following, the embodiments of the disclosure are described with reference to the drawings. In the following description and accompanying drawings for the respective embodiments, substantially identical or equivalent parts are labeled with like reference symbols.

Figure 1:
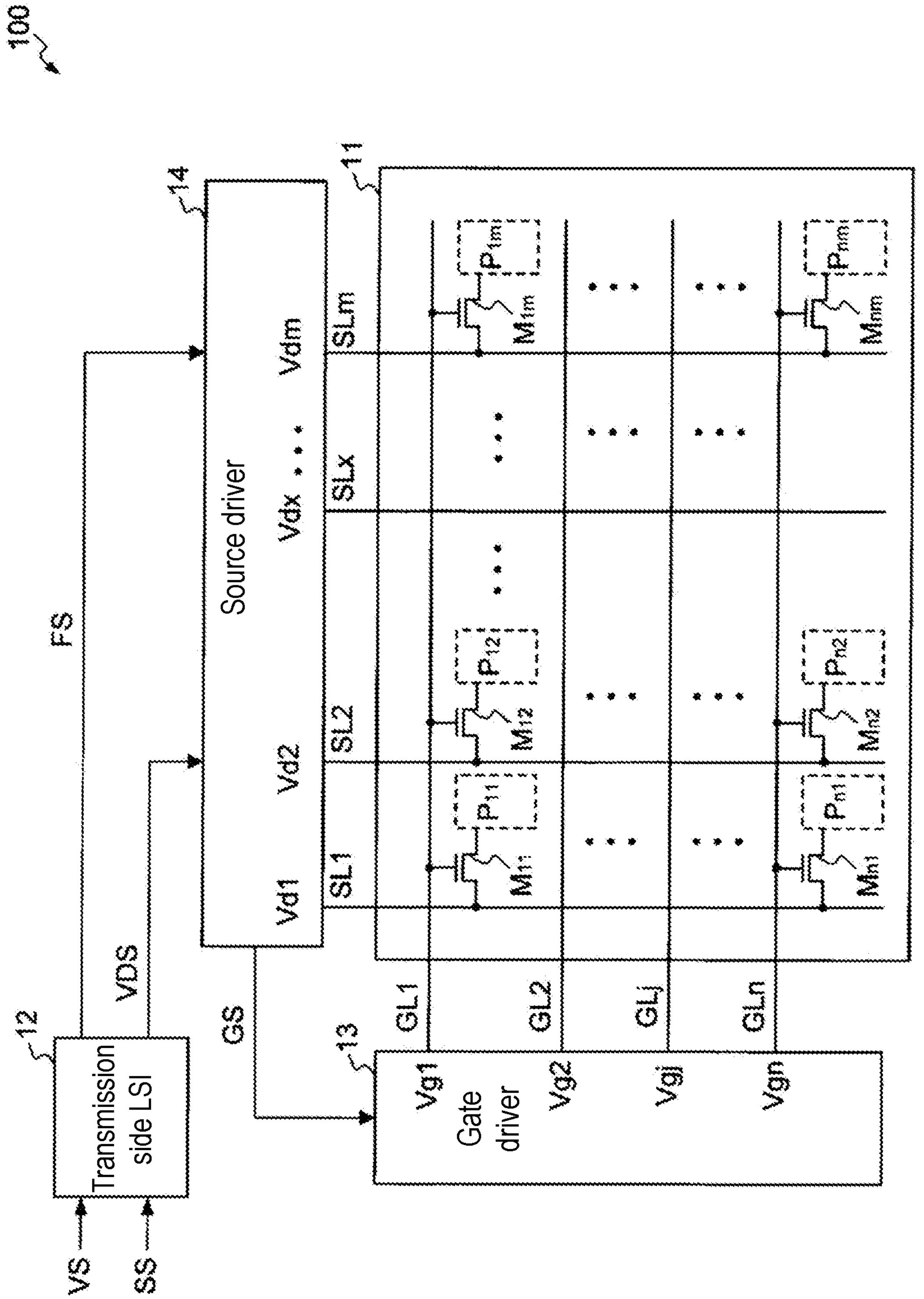
FIG. 1 is a block diagram illustrating a configuration of a display device according to the disclosure.

FIG. 1 is a block diagram illustrating the configuration of a display device 100 according to the disclosure. The display device 100 is a liquid crystal display device of active matrix driving, and is configured as a small-sized liquid crystal display device for vehicles according to the embodiment. The display device 100 includes a display panel 11, a transmission side LSI 12, a gate driver 13, and a source driver 14.

The display panel 11 is formed from a semiconductor substrate on which multiple pixel parts P11 to Pnm and pixel switches M11 to Mnm (n and m being natural numbers equal to or more than 2) arranged in a matrix. The display panel 11 has n gate lines GL1 to GLn and m source lines SL1 to SLm. The gate lines GL1 to GLn are scan lines respectively extending in the horizontal direction. The source lines SL1 to SLm are data lines arranged to intersect with the gate lines GL1 to GLn. The pixel parts P11 to Pnm and the pixel switches M11 to Mnm are provided at intersection parts between the gate lines GL1 to GLn and the source lines SL1 to SLm.

The pixel switches M11 to Mnm are controlled to be turned on or off in accordance with gate signals Vg1 to Vgn supplied from the gate driver 13.

The pixel parts P11 to Pnm receive supply of gradation voltages (driving voltages) corresponding to the video data from the source driver 14. Specifically, gradation voltage signals Vd1 to Vdm from the source driver 14 are output to the source lines SL1 to SLm and when the pixel switches M11 to Mnm are respectively turned on, the gradation voltage signals Vd1 to Vdm are applied to the pixel parts P11 to Pnm. Accordingly, the pixel electrodes of the respective pixel parts P11 to Pnm are charged, and the brightness is controlled.

Each of the pixel parts P11 to Pnm includes a transparent electrode and a liquid crystal. The transparent electrode is connected with the source lines SL1 to SLm via the pixel switches M11 to Mnm, and the liquid crystal is sealed with respect to a counter substrate which faces the semiconductor substrate and on which one transparent electrode is formed on the entire surface. Display is performed by changing the liquid crystal transmissivity in accordance with the potential difference between the gradation voltages (driving voltages) applied to the pixel parts P11 to Pnm and the counter substrate voltage.

In addition, in the pixel parts P11 to Pnm, every three adjacent pixel parts (i.e., pixel parts of 3ch) among m pixel parts disposed along the expanding direction of the gate line correspond to three pixels of R (red), G (green), and B (blue). That is, when j=(⅓)m, 1ch, 4ch, . . . , (3j−2)ch, 2ch, 5ch, . . . , (3j−1)ch, and 3ch, 6ch, . . . , 3jch respectively correspond to “R”, G”, and “B”. For example, by combining the combination of R, G, B, of 1ch, 2ch, and 3ch, one color is rendered.

The transmission side LSI 12 is a large scale integration (LSI) on the transmission side transmitting video data by using low voltage differential signaling (LVDS). The transmission side LSI 12 receives supply of video data VS and generates a video data signal VDS based on the video data VS, the video data signal VDS being formed a series (serial signals) of pixel data pieces PD representing brightness levels of respective pixels by using brightness gradations of 256 stages of 8 bits, for example.

In addition, the transmission side LSI receives supply of a synchronization signal SS and generates a frame synchronization signal FS indicating the timing per frame of the video data signal VDS based on the synchronization signal SS. The transmission side LSI uses the interface of LVDS and supplies the video data signal VDS and the frame synchronization signal FS to the source driver 14.

Figure 2:
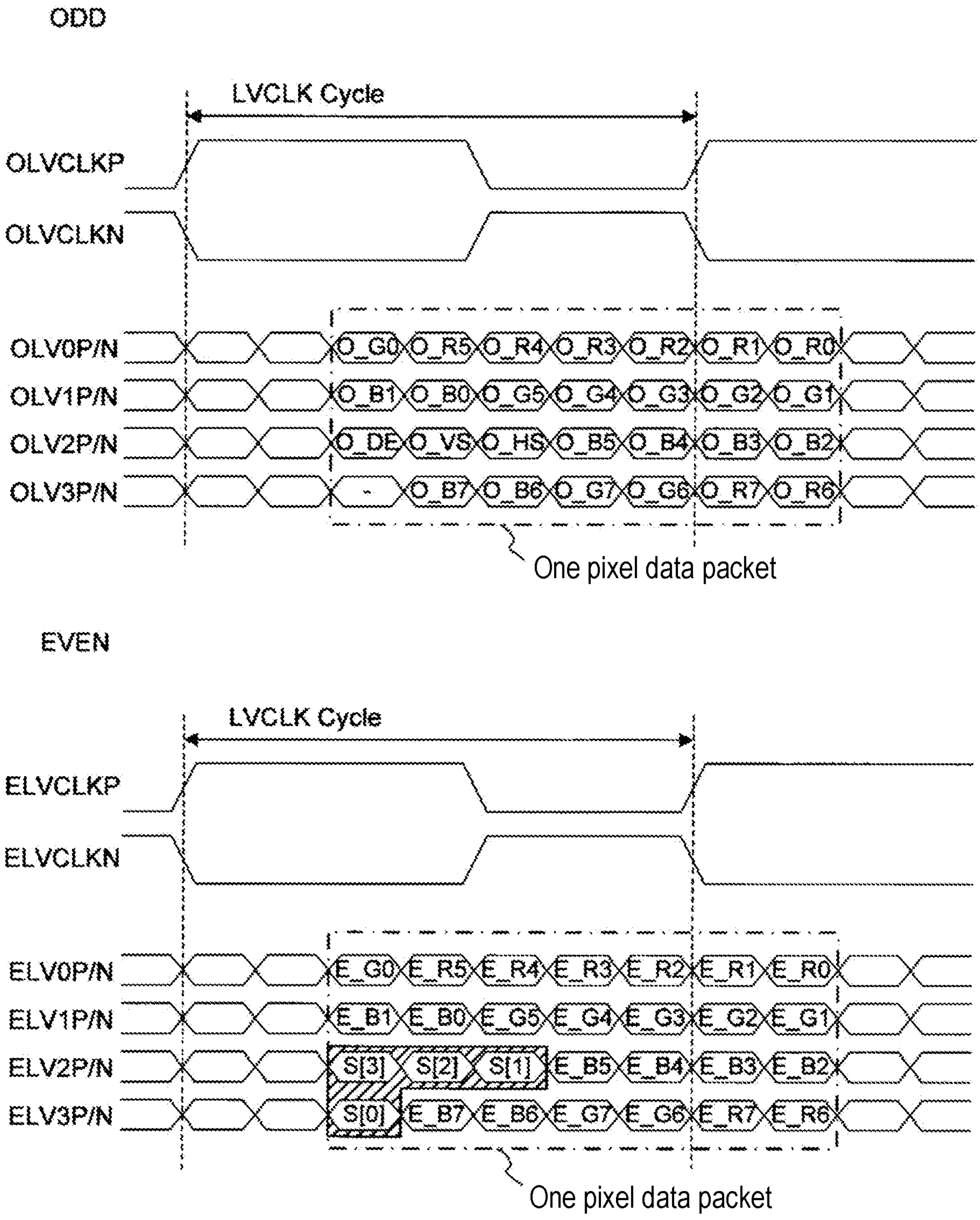
FIG. 2 is a diagram illustrating an example of a data format of LVDS.

FIG. 2 is a diagram illustrating an example of a data format at the time of transmitting the video data signal VDS and the frame synchronization signal FS by using LVDS.

In the embodiment, the transmission side LSI 12 transmits the video data signal VDS and the frame synchronization signal FS in a two-port mode of LVDS. The upper part of the diagram illustrates a data region of an odd-numbered port (indicated as “ODD” in the diagram) that is the first port. The lower part of the diagram illustrates a data region of an even-numbered port (indicated as “EVEN” in the diagram) that is the second port.

The portion surrounded by a dot-chain line in the diagram illustrates a data region corresponding to a data packet of one pixel. The data packet of one pixel of the odd-numbered port includes image data (pixel data piece) of 8 bits for each of RGB and data corresponding to the synchronization signal. Here, O_R0, O_R1, . . . , O_R7 represent image data of 8 bits of the pixel R, O_G0, O_G1, . . . , O_G7 represent image data of 8 bits of the pixel G, and O_B0, O_B1, . . . , O_B7 represent image data of 8 bits of the pixel B. In addition, O_DE, O_HS, and O_VS represent data corresponding to the synchronization signal. In addition, the data packet of the odd-numbered port includes an empty region of one bit.

The data packet of one pixel of the even-numbered port, like the data packet of the odd-numbered port, includes image data (image data piece) of 8 bits for each of RGB. Meanwhile, differing from the data packet of the odd-numbered port, the data packet of the even-numbered port does not include the data (O_DE, O_HS, and O_VS) corresponding to the synchronization signal.

In the data packet of the even-numbered port, S[0], S[1], S[2], and S[3], which are code values (referred to as “checksum value”) of a checksum of four bits, are assigned to the regions corresponding to the region of the synchronization signal of the three bits and the empty region of one bit of the odd-numbered port. The checksum value is used to detect a data communication abnormality with the transmission side LSI 12 in the source driver 14.

Referring to FIG. 1 again, the gate driver 13 receives the supply of a gate control signal GS from the source driver 14 and supplies gate signals Vg1 to Vgn in order to gate lines GL1 to GLn based on a clock timing included in the gate control signal GS.

By supplying the gate signals Vg1 to Vgn, the pixel parts P11 to Pnm are selected for every pixel row. By applying the gradation voltage signals Vd1 to Vdm from the source driver 14 to the selected pixel parts, gradation voltages are written to pixel electrodes. By repetitively supplying the gradation voltage signals Vd1 to Vdm while selectively switching pixel parts of to one row, screen display for one frame is performed.

The source driver 14 receives the supply of the video data signal VDS from the transmission side LSI 12, generates the gradation voltage signals Vd1 to Vdm corresponding to multi-level gradation voltages in accordance with the number of gradations indicated in the video data signal VDS, and applies the gradation voltage signals Vd1 to Vdm to the pixel parts P11 to Pnm via the source lines SL1 to SLm. In addition, the source driver 14 generates the gate control signal GS controlling the operation timing of the gate driver 13 based on the frame synchronization signal FS, and supplies the gate control signal GS to the gate driver 13.

In addition, the source driver 14 has a function of detecting an abnormality of data communication with the transmission side LSI 12, that is, an abnormality of transmission of the video data signal VDS and the frame synchronization signal FS from the transmission side LSI 12 through LVDS. When detecting an abnormality of data communication, the source driver 14 stops supply of the gate control signal GS to the gate driver 13. In addition, in the case where the abnormality of data communication continues for several frames, the source driver 14 resumes the supply of the gate control signal GS to the gate driver 13, outputs gradation voltage signals Vd1 to Vdm based on predetermined gradation data, which are different from the video data signal VDS supplied from the transmission side LSI 12, to the source lines SL1 to SLm, and displays an on-screen display (OSD) image indicating that a communication abnormality occurs on the display panel 11.

Figure 3:
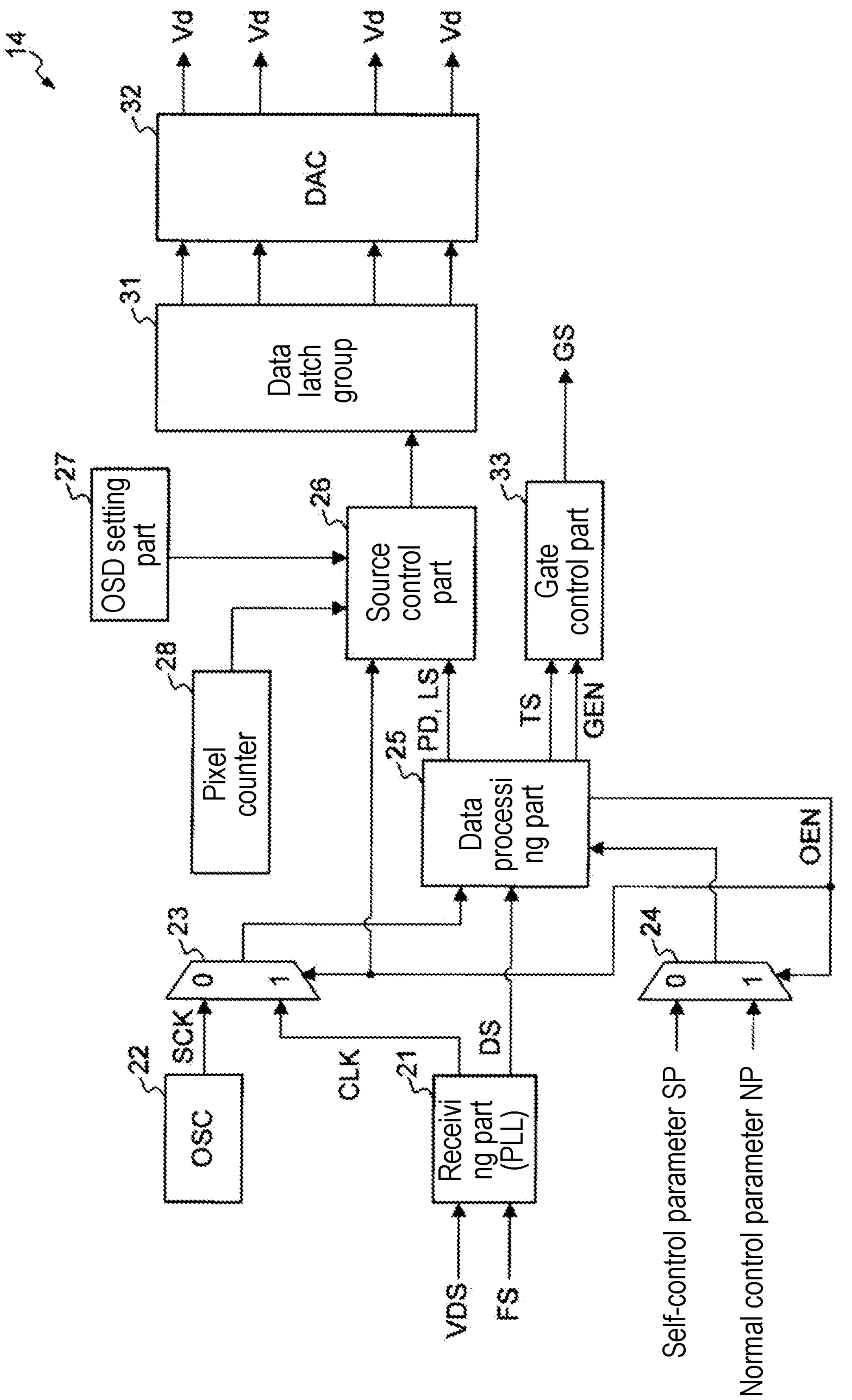
FIG. 3 is a block diagram illustrating a configuration of a source driver.

FIG. 3 is a block diagram illustrating the configuration of the source driver 14 of the embodiment. The source driver 14 includes a receiving part (PLL) 21, an oscillator (OSC) 22, a selector 23, a selector 24, a data processing part 25, a source control part 26, an OSD setting part 27, a pixel counter 28, a data latch group 31, a DA converter 32, and a gate control part 33.

The receiving part 21 receives the video data signal VDS and the frame synchronization signal FS transmitted from the transmission side LSI 12 by LVDS. The receiving part 21 includes a phase locked loop (PLL) circuit, and generates a clock signal CLK based on the video data signal VDS and the frame synchronization signal FS. In addition, the receiving part CLK generates a serial data signal DS synchronized with the clock signal CLK and provides the serial data signal DS to the data processing part 25.

The oscillator 22 (shown as OSC in FIG. 3) is an oscillation circuit that oscillates at a predetermined frequency (fixed frequency) set in advance. The oscillator 22 generates and outputs a built-in oscillation clock signal SCK through oscillation.

The selector 23 is a selector that receives the input of the clock signal CLK output from the receiving part 21 and the built-in oscillation clock signal SCK output from the oscillator 22 and selectively switches to output one of the clock signal CLK and the built-in oscillation clock signal SCK. The selector 23 receives the supply of an OSD enable signal OEN from the data processing part 25, and switches the output according to the OSD enable signal OEN.

Specifically, in the case where the signal level of the OSD enable signal OEN is at a logic level 1 (also referred to as "H level"), the selector 23 outputs the clock signal CLK, and in the case where the signal level of the OSD enable signal OEN is at a logic level 0 (also referred to as "L level"), the selector 23 outputs the built-in oscillation clock signal SCK. The clock signal CLK or the built-in oscillation clock signal SCK output from the selector 23 is supplied to the data processing part 25.

The selector 24 is a selector that selectively outputs one of a self-control parameter SP and a normal control parameter NP. The selector 24 receives the supply of the OSD enable signal OEN from the data processing part 25, and switches the output according to the OSD enable signal OEN.

The self-control parameter SP and the normal control parameter NP are stored in a storage device (omitted in FIG. 3), such as a semiconductor memory, provided inside the source driver 14. The self-control parameter SP and the normal control parameter NP include the information (e.g., a clock timing of a gate clock signal) for controlling the output of the gate signals Vg1 to Vgn by the gate driver 13.

The normal control parameter NP is a parameter for controlling the gate driver 13 in a normal mode. Meanwhile, the self-control parameter SP is a parameter used for controlling the gate driver 13 in a self-control mode that is a mode for displaying an OSD image.

In the case where the signal level of the OSD enable signal OEN is at H level, the selector 24 outputs the normal control parameter NP. The output normal control parameter NP is supplied to the data processing part 25. In addition, in the case where the signal level of the OSD enable signal OEN is at L level, the selector 24 outputs the self-control parameter SP. The output self-control parameter SP is supplied to the data processing part 25.

The data processing part 25 performs serial-parallel conversion on the data signal DS, and generates and supplies parallel pixel data pieces PD to the source control part 26.

In addition, the data processing part 25 generates a horizontal synchronization signal LS, and supplies the horizontal synchronization signal LS to the source control part 26. For example, in the case where the signal level of the OSD enable signal OEN is at H level (that is, the normal mode), the data processing part 25 generates the horizontal synchronization signal LS based on the clock signal CLK supplied via the selector 23. Meanwhile, in the case where the signal level of the OSD enable signal OEN is at L level (that is, the self-control mode), the data processing part 25 generates the horizontal synchronization signal LS based on the built-in oscillation clock signal SCK supplied via the selector 23.

In addition, based on the clock signal (i.e., the clock signal CLK or the built-in oscillation clock signal SCK) supplied via the selector 23 and the self-control parameter SP or the normal control parameter NP supplied via the selector 24, the data processing part 25 generates a timing signal TS for controlling the gate driver 13.

In addition, the data processing part 25 has a function of determining whether the data communication with the transmission side LSI 12 is abnormal based on a checksum value included in the data transmitted from the transmission side LSI 12 by LVDS. Based on the determination result, the data processing part 25 generates a gate enable signal GEN that controls the output of the gate control signal GS by the gate control part 33 and the stopping of the output.

In addition, the data processing part 25 determines whether a communication abnormality occurs continuously for a predetermined number of frames, and generates the OSD enable signal OEN based on the determination result. The data processing part 25 generates the OSD enable signal OEN having a signal level of L level in the case where the communication abnormality continues for the predetermined number of frames and the OSD enable signal OEN having a signal level of H level in the case where the communication abnormality does not continue.

Figure 4:
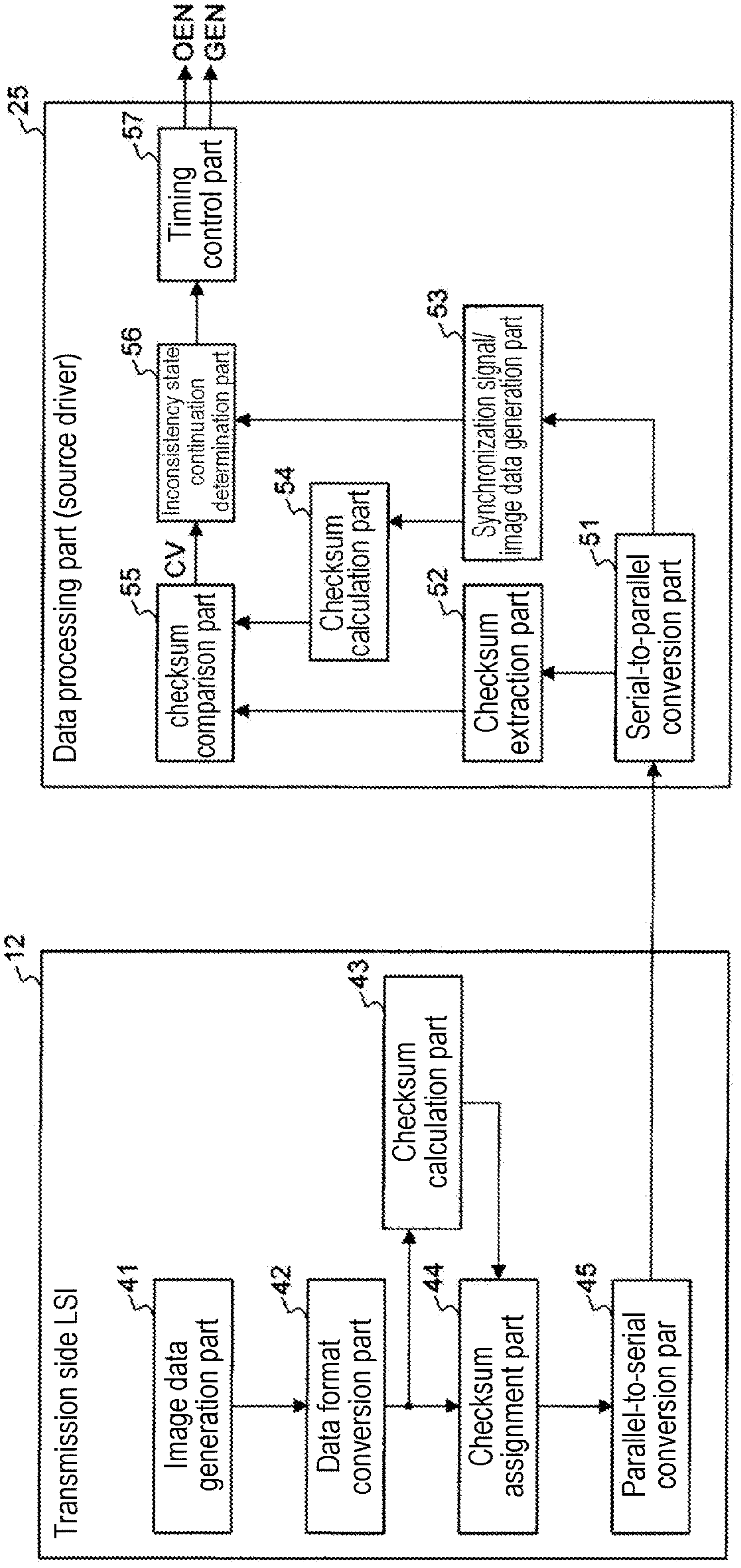
FIG. 4 is a block diagram illustrating an internal configuration of a transmission side LSI and a data processing part.

FIG. 4 is a block diagram illustrating an internal configuration of the transmission side LSI 12 and the data processing part 25.

The transmission side LSI 12 has an image data generation part 41, a data format conversion part 42, a checksum calculation part 43, a checksum assignment part 44, and a parallel-to-serial conversion part 45.

The image data generation part 41 generates image data including a series of the pixel data pieces PD based on the video data VS.

The data format conversion part 42 converts the image data generated by the image data generation part 41 into the data format of LVDS.

The checksum calculation part 43 performs checksum calculation based on the pixel data pieces PD included in the image data converted into the data format of LVDS and calculates the checksum value.

The checksum assignment part 44 assigns the checksum value calculated by the checksum calculation part 43 to the image data, and generate a parallel video data signal.

The parallel-to-serial conversion part 45 performs parallel-to-serial conversion on the parallel video data signal to which the checksum value is assigned, and generates the serial video data signal VDS.

The video data signal VDS is transmitted from the transmission side LSI 12 to the source driver 14 through data communication of LVDS.

The data processing part 25 includes a serial-to-parallel conversion part 51, a checksum extraction part 52, a synchronization signal/image data generation part 53, a checksum calculation part 54, a checksum comparison part 55, an inconsistency state continuation determination part 56, and a timing control part 57.

The serial-to-parallel conversion part 51 acquires, as the serial data signal DS, the video data signal VDS transmitted from the transmission side LSI 12 via the receiving part 21 (omitted in FIG. 5). The serial-to-parallel conversion part 51 performs serial-to-parallel conversion on the data signal DS.

The checksum extraction part 52 extracts the checksum value included in the data signal DS (that is, the checksum value transmitted from the transmission side LSI 12 by using LVDS) converted into parallel.

The synchronization signal/image data generation part 53 generates parallel video data (pixel data pieces PD) and the horizontal synchronization signal LS based on the data signal DS converted into parallel by the serial-to-parallel conversion part 51.

The checksum calculation part 54 calculates the checksum based on the parallel image data generated by the synchronization signal/image data generation part 53.

FIG. 5 is a diagram illustrating an example of checksum calculation by using the checksum calculation part 54. Here, an example for calculating the checksum value corresponding to a data packet for one pixel is shown.

In the embodiment, the upper four bits and the lower four bits of RGB in the odd-numbered port and the upper four bits, the lower four bits of RGB in the even-numbered port, and the bit of the synchronization signal in the odd-numbered port are added to calculate the checksum value.

Referring to FIG. 4 again, the checksum comparison part 55 compares the checksum value extracted by the checksum extraction part 52 and the checksum value calculated by the checksum calculation part 54, and outputs a checksum comparison result CV having the value of the logic level 1 (H level) in the case where the checksum values are consistent and the value of the logic level 0 (L level) in the case where the checksum values are not consistent with each other.

The inconsistency state continuation determination part 56 determines for a period of how many frames the state in which the checksum values are not consistent continues (i.e., for a period corresponding to how many frames of the data communication the video data signal VDS have elapsed) based on the checksum comparison result CV output from the checksum comparison part 55.

The timing control part 57 outputs the gate enable signal GEN and the OSD enable signal OEN based on the determination result according to the inconsistency state continuation determination part 56. Specifically, in the case where it is determined that the checksum values are consistent (i.e., the state of inconsistency has 0 frames), the timing control part 57 outputs the gate enable signal GEN and the OSD enable signal OEN at H level.

Meanwhile, in the case where the state in which the checksum values are inconsistent occurs and a period less than the predetermined number of frames has lapsed since the occurrence, the timing control part 57 outputs the gate enable signal GEN at L level and the OSD enable signal OEN at H level.

In addition, in the case where it is determined that the state in which the checksum values are inconsistent occurs and a period equal to or greater than the predetermined number of frames continues, the timing control part 57 outputs the gate enable signal GEN at H level and the OSD enable signal OEN at L level.

Referring to FIG. 3 again, the source control part 26 controls the import operation of the pixel data pieces PD of the data latch group 31 based on data mapping determined by the gate lines GL1 to GLn and the source lines SL1 to SLm.

Specifically, in the case where the OSD enable signal OEN is at H level (i.e., the normal mode), the source control part 26 supplies the parallel pixel data pieces PD supplied from the data processing part 25 to the first latch of the data latch group 31, and causes the pixel data pieces PD to be stored in order according to the data mapping. In addition, the source control part 26 supplies the horizontal synchronization signal LS generated based on the data signal DS to the second latch of the data latch group 31 and causes the pixel data pieces PD to be stored by using the horizontal synchronization signal LS as the import clock.

Meanwhile, in the case where the OSD enable signal OEN is at L level (that is, self-control mode), based on the setting data of the OSD setting part 27, the source control part 26 causes pixel data pieces (referred to as "gradation data pieces" in the following) corresponding to the gradation data for displaying the abnormality notification screen on the display panel 11 to be stored to the first latch of the data latch group 31 in accordance with the timing of the pixel counter 28. In addition, the source control part 26 stores, to the second latch, the gradation data pieces set based on the setting of the OSD setting part 27 by using the horizontal synchronization signal LS generated based on the built-in oscillation clock signal SCK as the import clock.

The OSD setting part 27 supplies the setting data for displaying the on-screen display (OSD) image on the display panel 11 to the source control part 26. The setting data include information regarding the control of the brightness of each of the pixel parts P11 to Pnm for displaying the abnormality notification screen that is a screen displayed in the case where abnormality detection continues through several frames. In the abnormality notification screen, for example, multiple pixel parts provided at a predetermined position of the display panel 11 are selected to form the shape of "x", the multiple pixel parts are written with gradation voltage signals Vd of a white gradation, and the rest pixel parts are written with gradation voltage signals Vd of a black gradation.

The pixel counter 28 is a counter that counts sequentially the pixel parts of one row along the expanding direction of one gate line, along the scanning direction of the gate signals Vg1 to Vgn according to the gate driver 13. At the time of displaying the abnormality notification screen, by synchronizing with the pixel counter 28, the gradation data pieces for each pixel are stored to the second latch of the data latch group 31 in synchronization with the counting of the pixel counter 28.

The data latch group 31 is formed by multiple latch circuits for importing the pixel data pieces PD in the normal mode and the gradation data pieces in the self-control mode. The data latch group 31 includes the first latch and the second latch (not shown). The first latch imports, for one row each time, the pixel data pieces PD or the gradation data pieces in accordance with the control of the source control part 26. The second latch imports, for each pixel, the pixel data pieces PD or the gradation data pieces stored to the first latch in accordance with the control of the source control part 26. The second latch imports the pixel data pieces PD or the gradation data pieces from the first latch at the rising edge of the horizontal synchronization signal LS.

The DA converter (DAC) 32 selects the gradation voltages corresponding to the pixel data pieces PD or the gradation data pieces output from the data latch group 31, performs digital-analog conversion, and generates the analog gradation voltage signals Vd. The generated analog gradation voltage signals Vd are amplified by an output amplifier (not shown) and output.

The gate control part 33 generates the gate control signal GS based on the timing signal TS supplied from the data processing part 25 and performs control of the gate driver 13. In addition, the gate control part 33 receives the supply of the gate enable signal GEN from the data processing part 25 and switches between execution and stopping of the control operation of the gate driver 13 based on the gate enable signal GEN. Specifically, in the case where the gate enable signal GEN is at the logic level 1, the gate control signal GS is supplied to the gate driver 13 to control the gate driver 13. Meanwhile, in the case where the gate enable signal GEN is at the logic level 0, the supply of the gate control signal GS to the gate driver 13 is stopped.

Figure 6:
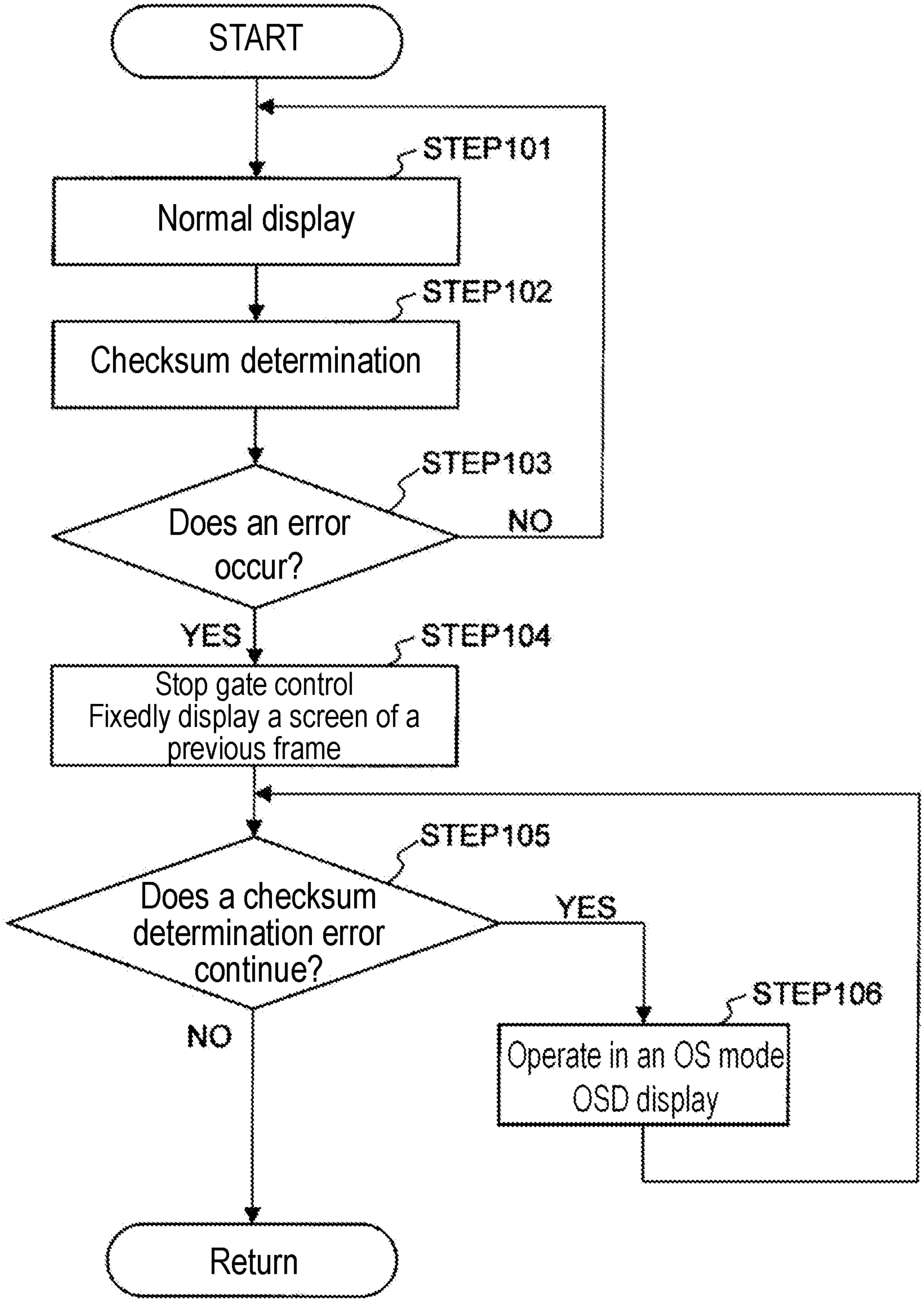
FIG. 6 is a flowchart illustrating a processing routine of an abnormality detection process.

Next, the operation of the display device 100 of the embodiment is described with reference to the time chart of FIG. 6.

Firstly, the source driver 14 outputs the gradation voltage signals Vd and controls the gate driver 13 based on the video data signal VDS and the frame synchronization signal FS supplied from the transmission side LSI 12. Accordingly, normal video display is performed on the display panel 11 (STEP101).

The data processing part 25 of the source driver 14 performs checksum determination based on the video data signal VDS transmitted from the transmission side LSI 12 through LVDS communication. Specifically, the data processing part 25 compares the checksum value assigned to the video data signal VDS transmitted from the transmission side LSI 12 and the checksum value newly calculated by the source driver 14 based on the new video data signal VDS (STEP102).

The data processing part 25 determines whether a communication error (communication abnormality) occurs based on the comparison result (STEP103). That is, the data processing part 25 determines that a communication error does not occur in the case where the checksum values are consistent, and determines that a communication error occurs in the case where the checksum values are not consistent.

When the data processing part 25 determines that a communication error does not occur (STEP103: NO), the flow returns to STEP101, and the source driver 14 continues with the normal display.

When the data processing part 25 determines that a communication error occurs (STEP103: YES), the gate control part 33 of the source driver 14 stops the supply of the gate signals Vg1 to Vgn by the gate driver 13. Accordingly, in the display screen of the display panel 11, the screen of one frame earlier is displayed fixedly in the display screen of the display panel 11 (STEP104).

The inconsistency state continuation determination part 56 determines whether the state of the communication error continues occurring (STEP105). Specifically, the inconsistency state continuation determination part 56 determines whether the state in which the checksum values are inconsistent continues for a period of the predetermined number of frames or more.

When the inconsistency state continuation determination part 56 determines that the state of the communication error does not continue occurring, i.e., the checksum values become consistent again (STEP105: NO), the flow returns to STEP101 again, and the normal video display is performed.

Meanwhile, when the inconsistency state continuation determination part 56 determines that the state of the communication error continues occurring, that is, the state in which the checksum values are inconsistent continues for a period of the predetermined number of frames or more (STEP105: YES), the source control part 26 of the source driver 14 stores, to the data latch group 31, the pixel data pieces based on the setting data of the OSD setting part 27, outputs the gradation voltage signals Vd corresponding to the pixel data pieces from the DA converter 32, and executes the OSD display.

Figure 7A:
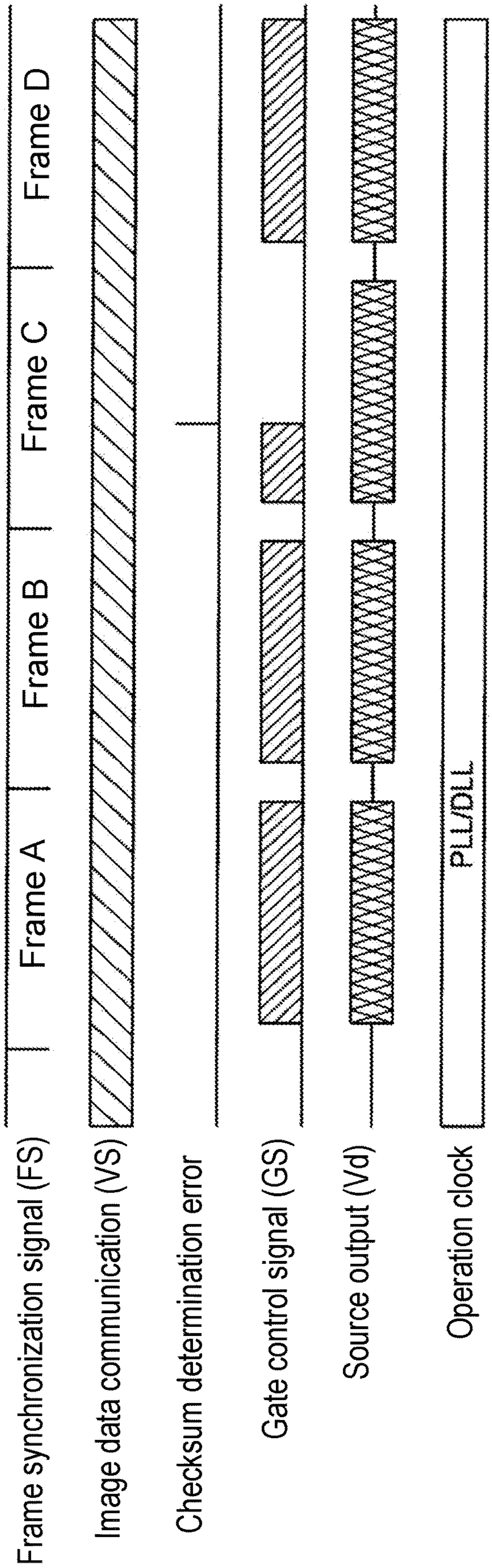
FIG. 7A is a time chart illustrating the operation of each part of the source driver.
Figure 7B:
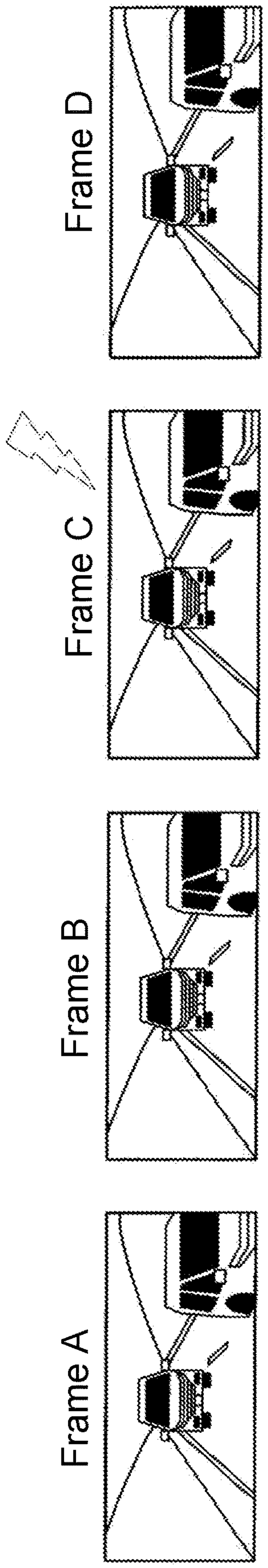
FIG. 7B is a diagram illustrating an example of display screens at the time of normal operation and at the time of abnormality detection.

FIG. 7A is a time chart illustrating the operation of each part of the source driver in the case where a communication error occurs temporarily due to noises, etc. FIG. 7B is a diagram illustrating an example of screens displayed on the display panel 11 in the case where a communication error occurs temporarily. Here, the case where a communication error in the communication of the video data signal VDS of a frame C is shown. In addition, the case where the display device 100 is used as an electronic mirror for vehicle use is shown as an example.

In Frames A and B, the checksum value received from the transmission side LSI 12 and the checksum value newly calculated by the source driver 14 based on the video data signal VDS are consistent. Therefore, the data processing part 25 outputs the gate enable signal GEN and the OSD enable signal OEN at H level.

The selector 23 supplies the clock signal CLK output from the receiving part 21 (i.e., the clock signals generated by the PLL circuit in the receiving part 21) to the data processing part 25. The selector 24 supplies the normal control parameter NP to the data processing part 25.

The data processing part 25 operates based on the clock signal CLK, and supplies the pixel data pieces PD and the horizontal synchronization signal LS to the source control part 26. In addition, the data processing part 25 supplies the timing signal TS generated based on the clock signal CLK to the gate control part 33.

The source control part 26 stores the pixel data pieces PD in the data latch group 31. The DA converter 32 selects the gradation voltages corresponding to the pixel data pieces PD to perform D/A conversion and generates the analog gradation voltage signals Vd. The generated analog gradation voltage signals VD are amplified and output as the source output. For each period of one frame shown in the frame synchronization signal FS, the source output for one frame is output. Accordingly, during the periods of the frames A and B, normal screen display is performed.

In the frame C, it is determined that the checksum values are temporarily inconsistent and a communication error occurs. The data processing part 25 outputs the gate enable signal GEN at L level. The gate control part 33 controls the gate driver 13 in accordance with the gate enable signal GEN at L level and stops the supply of the gate signals Vg1 to Vgn. Accordingly, in the display screen of the frame C, the screen of one frame earlier is displayed fixedly.

In a frame D, the state in which the checksum values are inconsistent is resolved, and it is determined that the communication error does not occur. The data processing part 25 outputs the gate enable signal GEN at H level. The gate control part 33 controls the gate driver 13 in accordance with the gate enable signal GEN at H level and resumes the supply of the gate signals Vg1 to Vgn. Accordingly, in the frame D, normal screen display is performed again.

Figure 8A:
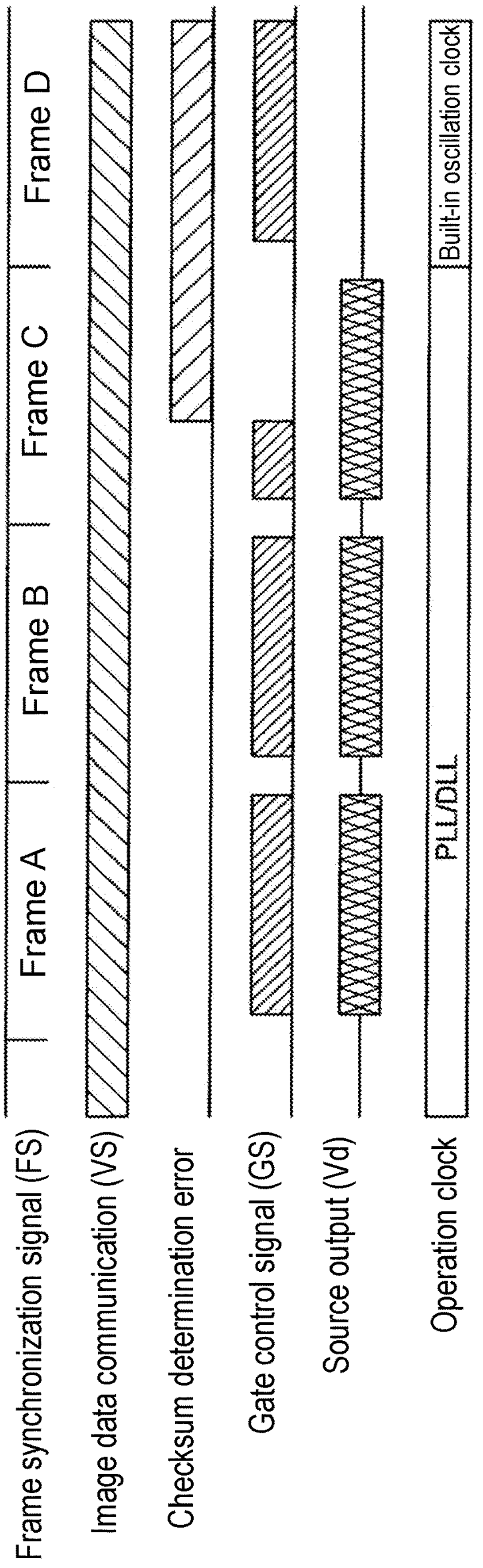
FIG. 8A is a time chart illustrating the operation of each part of the source driver.
Figure 8B:
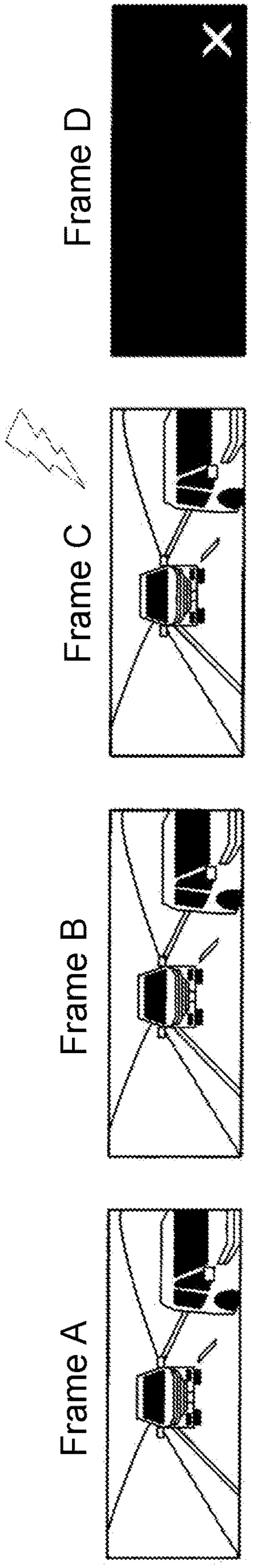
FIG. 8B is a diagram illustrating an example of display screens at the time of normal operation and at the time of abnormality detection.

FIG. 8A is a time chart illustrating the operation of each part of the source driver in the case where the communication error continues occurring, that is, the case where the state in which the checksum values are inconsistent continues for a period of the predetermined number of frames or more. FIG. 8B is a diagram illustrating an example of screens displayed on the display panel 11 at this time. Here, as an example, the case where the predetermined number of frames for determining that the communication error continues occurring is "2".

In Frames A and B, the checksum value received from the transmission side LSI 12 and the checksum value newly calculated by the source driver 14 based on the video data signal VDS are consistent. Therefore, the data processing part 25 outputs the gate enable signal GEN and the OSD enable signal OEN at H level.

Accordingly, the respective parts of the source driver 14 operate normally. Therefore, during the periods of the frames A and B, normal screen display is performed.

In the frame C, it is determined that the checksum values are inconsistent and a communication error occurs. The data processing part 25 outputs the gate enable signal GEN at L level. The gate control part 33 controls the gate driver 13 in accordance with the gate enable signal GEN at L level and stops the supply of the gate signals Vg1 to Vgn. Accordingly, in the display screen of the frame C, the screen of one frame earlier is displayed fixedly.

In the frame D, it is determined that the checksum values are inconsistent and the communication error continues. Therefore, the data processing part 25 switches the gate enable signal GEN to H level and outputs the OSD enable signal OEN at L level.

The selector 23 performs switching in accordance with the change of the OSD enable signal OEN from the logic level 1 to the logic level 0, and supplies the built-in oscillation clock signal SCK output from the oscillator 22 to the data processing part 25. The selector 24 supplies the self-control parameter SP to the data processing part 25.

The data processing part 25 generates the horizontal synchronization signal LS based on the built-in oscillation clock signal SCK, and supplies the horizontal synchronization signal LS to the source control part 26. In addition, the data processing part 25 generates the timing signal TS based on the built-in oscillation clock signal SCK and supplies the timing signal TS to the gate control part 33.

The source control part 26 stores the gradation data pieces in the data latch group 31 based on the OSD setting according to the OSD setting part 27. The DA converter 32 selects the gradation voltages corresponding to the gradation data pieces to perform D/A conversion and generates the analog gradation voltage signals Vd. The generated analog gradation voltage signals Vd are amplified and output as the source output.

Accordingly, in the frame D, the abnormality notification screen indicating that the communication abnormality occurs is displayed on the display panel 11. For example, as shown in FIG. 8B, a screen which includes a "x" mark shown in white at the lower right within the display screen and the entirety of the rest region is displayed in black is displayed on the display panel 11 as the abnormality notification screen.

According to the above, in the display device 100 according to the embodiment, the empty region provided in the data packet of one pixel for the data format of LVDS, that is, the region other than the region to which the respective 8 bits of RGB are assigned among the data regions of the even-numbered port, is assigned with the code value of the checksum, and the video data signal VDS is transmitted. The source driver 14 receiving the video data signal VDS determines whether a communication error occurs during the transmission of the video data signal VDS based on the code value of the received checksum and the code value of the checksum calculated by itself.

According to such configuration, differing from the case of transmitting the expected value of a CRC code by another interface, for example, the detection of the communication error can be performed real-time. In addition, in the case where the display contents change in each frame, a communication error can also be detected.

In addition, in the case where a temporary communication error, such as noise, occurs, the display device 100 of the embodiment fixedly displays the image that is one frame earlier. Since the state of the communication abnormality is resolved and the display device 100 returns to normal display in the next frame, the user, such as a driver, can continue with the visual recognition of the display frame without feeling uncomfortable.

In addition, in the case where the communication abnormality continues occurring, the display device 100 of the embodiment displays on the display panel 11 the abnormality notification screen notifying that the communication abnormality occurs. Accordingly, for the user that visually recognizes the display screen, it is possible to visually present, in an easy-to-understand manner, that the communication abnormality occurs. Specifically, in the case where the display device 100 of the embodiment is used as an electronic mirror for vehicle use, the driver can be prevented from misperceiving the driving situation.

Therefore, according to the display device 100 according to the embodiment, the occurrence of a communication abnormality can be quickly detected, and the occurrence of the abnormality can be visually presented in the video data transmission by using LVDS.

However, the disclosure is not limited to the above embodiments. For example, the method for calculating the checksum value is not limited to those described in the embodiment. For example, as shown in FIG. 9, it may also be that the checksum value is calculated by eliminating the data of the lower four bits having a less effect on image display and adding the upper four bits of RGB in the even-numbered port and the bit of the synchronization signal in the odd-numbered bit.

In addition, in the embodiment, the case of using the code value of the checksum is described as an example. However, the disclosure is not limited thereto. Other code values (arithmetic values) that can be calculated based on the pixel data pieces forming the video data signal VDS and assigned to the empty region of the data packet for one pixel in the data format of LVDS may also be used.

In addition, in the embodiment, the case where the display device 100 has one source driver 14 is described. However, differing from this, multiple source drivers having the same function may also be provided in multiple numbers along the expanding direction of the gate line. In such configuration, in the case where one source driver detects a communication abnormality, for example, by notifying other source drivers of the abnormality, fixed display, OSD display, etc., can be preformed as a whole.

What is claimed is:

1. A display device, having:

a display panel, having a plurality of data lines, a plurality of gate lines, and a plurality of pixel parts provided in a matrix arrangement at respective intersection parts between the data lines and the gate lines;

a gate driver, supplying gate signals to the gate lines;

a source driver, receiving a video data signal indicating a video displayed on the display panel, supplying gradation voltage signals to a plurality of pixel parts via the data lines based on the video data signal, and supplying to the gate driver a gate control signal controlling an operation of the gate driver; and a video data transmission part, transmitting the video data signal to the source driver by using low voltage differential signaling (LVDS), wherein the video data transmission part assigns, to an empty region that is a region other than regions assigned to a plurality of pixel data pieces forming one pixel of the video data signal in each data packet defined for a time of transmitting the video data signal for one pixel by using LVDS, an arithmetic value calculated based on the pixel data pieces, and transmits to the source driver together with the pixel data pieces as the video data signal.

2. The display device as claimed in claim 1, wherein the arithmetic value is a code value of a checksum.

3. The display device as claimed in claim 2, wherein the data packet for one pixel by using LVDS comprises a data region of an odd-numbered port and a data region of an even-numbered port, and the video data transmission part assigns the code value of the checksum to the empty region in the data region of the even-numbered port.

4. The display device as claimed in claim 2, wherein the source driver calculates a code value of a checksum based on the pixel data pieces comprised in the video data signal received from the video data transmission part, compares the code value that is calculated with the code value of the checksum transmitted from the video data transmission part, and determines whether a communication error occurs in communication with the video data transmission part based on a comparison result.

5. The display device as claimed in claim 4, wherein, in a case where it is determined that the communication error occurs in the communication with the video data communication part, the source driver controls the gate driver and stops supply of the gate signals.

6. The display device as claimed in claim 5, wherein, in a case where it is determined that the communication error occurs in the communication with the video data transmission part and a state of the communication error continues for a period of a predetermined length, the source driver controls the gate driver and resumes the supply of the gate signals and supply to the respective pixel parts gradation voltage signals corresponding to predetermined gradation data different from the gradation voltage signals based on the video data signal.

7. A source driver, connected with a display panel having a plurality of data lines, a plurality of gate lines, and a plurality of pixel parts provided in a matrix arrangement at respective intersection parts between the data lines and the gate lines, receiving a video data signal transmitted by using low voltage differential signaling (LVDS), generating gradation voltage signals based on the video data signal that is received, and supplying the gradation voltage signals to the pixel parts, wherein the source driver comprises:

a receiving part, receiving the video data signal;

an acquisition part, acquiring a code value of a checksum comprised in each data packet for one pixel in the video data signal that is received; and a calculation part, calculating a code value of a checksum based on a plurality of pixel data pieces comprised in each data packet for one pixel in the video data signal that is received; and a comparison part, comparing the code value of the checksum acquired by the acquisition part and the code value of the checksum calculated by the calculation part, wherein the source driver determines whether a communication error occurs in transmission of the video data signal based on a comparison result.

8. The source driver as claimed in claim 7, comprising a gate control part, controlling an operation of a gate driver supplying gate signals to the gate lines, wherein, in a case where it is determined that the communication error occurs in the transmission of the video data signal, the gate control part controls the gate driver and stops supply of the gate signals.

9. The source driver as claimed in claim 8, wherein, in a case where it is determined that the communication error occurs in communication with the video data transmission part and a state of the communication error continues for a period of a predetermined length, the source driver controls the gate driver and resumes the supply of the gate signals and supply to the respective pixel parts gradation voltage signals corresponding to predetermined gradation data different from the gradation voltage signals based on the video data signal.

* * * * *